United States Patent … US 6,869,023 B2
Hawes … Date of Patent: Mar. 22, 2005

(54) LINKING DOCUMENTS THROUGH DIGITAL WATERMARKING

(75) Inventor: Jonathan L. Hawes, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 43 days.

(21) Appl. No.: 10/172,506

(22) Filed: Jun. 14, 2002

(65) Prior Publication Data

US 2003/0150922 A1 Aug. 14, 2003

Related U.S. Application Data

(63) Continuation-in-part of application No. 10/094,593, filed on Mar. 6, 2002.
(60) Provisional application No. 60/356,881, filed on Feb. 12, 2002.

(51) Int. Cl.$^7$ .............................................. G06K 19/06
(52) U.S. Cl. ..................................................... 235/494
(58) Field of Search ................................ 235/487, 494; 283/27, 73, 113, 17; 380/51

(56) References Cited

U.S. PATENT DOCUMENTS

| | | |
|---|---|---|
| 3,569,619 A | 3/1971 | Simjian |
| 3,665,162 A | 5/1972 | Yamamoto et al. |
| 3,703,628 A | 11/1972 | Philipson, Jr. |
| 3,805,238 A | 4/1974 | Rothfjell |
| 3,838,444 A | 9/1974 | Loughlin et al. |
| 3,845,391 A | 10/1974 | Crosby |
| 3,914,877 A | 10/1975 | Hines |
| 3,922,074 A | 11/1975 | Ikegami et al. |
| 3,984,624 A | 10/1976 | Waggener |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,423,415 A | 12/1983 | Goldman |
| 4,425,642 A | 1/1984 | Moses et al. |
| 4,476,468 A | 10/1984 | Goldman |

(List continued on next page.)

FOREIGN PATENT DOCUMENTS

| | | |
|---|---|---|
| CA | 2235002 | 12/1998 |
| DE | 2943436 | 5/1981 |
| DE | 3806411 | 9/1989 |

(List continued on next page.)

OTHER PUBLICATIONS

U.S. Appl. No. 60/000,442, filed Jun. 20, 1995, Hudetz.
U.S. Appl. No. 60/082,228, filed Apr. 16, 1998, Rhoads.
U.S. Appl. No. 60/141,763, filed Jun. 30, 1999, Davis.

(List continued on next page.)

Primary Examiner—Karl D. Frech
Assistant Examiner—Jamara A. Franklin
(74) Attorney, Agent, or Firm—Digimarc Corporation

(57) ABSTRACT

The present invention relates to linking documents through digital watermarking. In one implementation, an identification document is embedded with a first digital watermark. The first digital watermark includes a first identifier. Before issuing a second document, like a boarding pass or ticket, the first identifier is extracted from the identification document. The first identifier is manipulated or altered to produce a second identifier. The second identifier, however, remains related to the first identifier. The second document is embedded with a second digital watermark including the second identifier. Thus, the identification document and the second document are linked through the first and second watermark identifiers.

22 Claims, 3 Drawing Sheets

U.S. PATENT DOCUMENTS

| | | |
|---|---|---|
| 4,528,588 A | 7/1985 | Lofberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,637,051 A | 1/1987 | Clark |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | D'Agralves et al. |
| 4,682,794 A | 7/1987 | Margolin |
| 4,689,477 A | 8/1987 | Goldman |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,876,617 A | 10/1989 | Best et al. |
| 4,879,747 A | 11/1989 | Leighton et al. |
| 4,884,139 A | 11/1989 | Pommier |
| 4,888,798 A | 12/1989 | Earnest |
| 4,903,301 A | 2/1990 | Kondo et al. |
| 4,908,836 A | 3/1990 | Rushforth et al. |
| 4,908,873 A | 3/1990 | Philibert et al. |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,947,028 A | 8/1990 | Gorog |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka et al. |
| 4,996,530 A | 2/1991 | Hilton |
| 5,010,405 A | 4/1991 | Schreiber et al. |
| 5,023,907 A | 6/1991 | Johnson |
| 5,027,401 A | 6/1991 | Soltesz |
| 5,036,513 A | 7/1991 | Greenblatt |
| 5,053,956 A | 10/1991 | Donald |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,095,196 A | 3/1992 | Miyata |
| 5,103,459 A | 4/1992 | Gilhousen et al. |
| 5,113,445 A | 5/1992 | Wang |
| 5,113,518 A | 5/1992 | Durst |
| 5,138,712 A | 8/1992 | Corbin |
| 5,146,457 A | 9/1992 | Veldhuis et al. |
| 5,148,498 A | 9/1992 | Resnikoff |
| 5,150,409 A | 9/1992 | Elsner |
| 5,161,210 A | 11/1992 | Druyvesteyn et al. |
| 5,166,676 A | 11/1992 | Milheiser |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,228,056 A | 7/1993 | Schilling |
| 5,237,164 A | 8/1993 | Takada |
| 5,243,423 A | 9/1993 | DeJean et al. |
| 5,245,329 A | 9/1993 | Gokcebay |
| 5,253,078 A | 10/1993 | Balkanski et al. |
| 5,258,998 A | 11/1993 | Koide |
| 5,259,025 A | 11/1993 | Monroe |
| 5,262,860 A | 11/1993 | Fitzpatrick |
| 5,267,334 A | 11/1993 | Normille et al. |
| 5,280,537 A | 1/1994 | Sugiyama et al. |
| 5,284,364 A | 2/1994 | Jain |
| 5,288,976 A | 2/1994 | Citron |
| 5,293,399 A | 3/1994 | Hefti |
| 5,295,203 A | 3/1994 | Krause et al. |
| 5,299,019 A | 3/1994 | Pack et al. |
| 5,305,400 A | 4/1994 | Butera |
| 5,315,098 A | 5/1994 | Tow |
| 5,319,453 A | 6/1994 | Copriviza et al. |
| 5,319,724 A | 6/1994 | Blonstein et al. |
| 5,319,735 A | 6/1994 | Preuss et al. |
| 5,325,167 A | 6/1994 | Melen |
| 5,336,871 A | 8/1994 | Colgate, Jr. |
| 5,337,361 A | 8/1994 | Wang et al. |
| 5,351,302 A | 9/1994 | Leighton et al. |
| 5,379,345 A | 1/1995 | Greenberg |
| 5,384,846 A | 1/1995 | Berson et al. |
| 5,385,371 A | 1/1995 | Izawa |
| 5,394,274 A | 2/1995 | Kahn |
| 5,404,377 A | 4/1995 | Moses |
| 5,408,542 A | 4/1995 | Callahan |
| 5,422,963 A | 6/1995 | Chen et al. |
| 5,422,995 A | 6/1995 | Aoki et al. |
| 5,428,607 A | 6/1995 | Hiller et al. |
| 5,428,731 A | 6/1995 | Powers |
| 5,432,870 A | 7/1995 | Schwartz |
| 5,446,273 A | 8/1995 | Leslie |
| 5,448,053 A | 9/1995 | Rhoads |
| 5,450,490 A | 9/1995 | Jensen et al. |
| 5,463,209 A | 10/1995 | Figh |
| 5,469,506 A | 11/1995 | Berson et al. |
| 5,471,533 A | 11/1995 | Wang et al. |
| 5,473,631 A | 12/1995 | Moses |
| 5,479,168 A | 12/1995 | Johnson et al. |
| 5,490,217 A * | 2/1996 | Wang et al. .................. 380/51 |
| 5,493,677 A | 2/1996 | Bfalogh |
| 5,495,411 A | 2/1996 | Ananda |
| 5,495,581 A | 2/1996 | Tsai |
| 5,496,071 A | 3/1996 | Walsh |
| 5,499,294 A | 3/1996 | Friedman |
| 5,515,081 A | 5/1996 | Vasilik |
| 5,524,933 A | 6/1996 | Kunt et al. |
| 5,530,852 A | 6/1996 | Meske, Jr. et al. |
| 5,548,645 A | 8/1996 | Ananda |
| 5,553,143 A | 9/1996 | Ross |
| 5,579,479 A | 11/1996 | Plum |
| 5,594,226 A | 1/1997 | Steger |
| 5,594,809 A | 1/1997 | Kopec et al. |
| 5,612,943 A | 3/1997 | Moses et al. |
| 5,613,004 A | 3/1997 | Cooperman et al. |

| Patent No. | Date | Inventor |
|---|---|---|
| 5,629,980 A | 5/1997 | Stefik |
| 5,634,012 A | 5/1997 | Stefik |
| 5,636,276 A | 6/1997 | Brugger |
| 5,636,292 A | 6/1997 | Rhoads |
| 5,638,443 A | 6/1997 | Stefik |
| 5,640,193 A | 6/1997 | Wellner |
| 5,640,647 A | 6/1997 | Hube |
| 5,646,997 A | 7/1997 | Barton |
| 5,646,999 A | 7/1997 | Saito |
| 5,652,626 A | 7/1997 | Kawakami et al. |
| 5,652,714 A | 7/1997 | Peterson |
| 5,657,462 A | 8/1997 | Brouwer |
| 5,659,164 A | 8/1997 | Schmid |
| 5,659,726 A | 8/1997 | Sandford, II et al. |
| 5,663,766 A | 9/1997 | Sizer, II |
| 5,664,018 A * | 9/1997 | Leighton ............ 380/54 |
| 5,665,951 A | 9/1997 | Newman et al. |
| 5,668,636 A | 9/1997 | Beach et al. |
| 5,671,277 A | 9/1997 | Ikenoue et al. |
| 5,671,282 A | 9/1997 | Wolff et al. |
| 5,673,316 A | 9/1997 | Auerbach et al. |
| 5,680,223 A | 10/1997 | Cooper et al. |
| 5,684,885 A | 11/1997 | Cass et al. |
| 5,687,236 A | 11/1997 | Moskowitz et al. |
| 5,689,620 A | 11/1997 | Kopec et al. |
| 5,694,471 A | 12/1997 | Chen et al. |
| 5,706,364 A | 1/1998 | Kopec et al. |
| 5,715,403 A | 2/1998 | Stefik |
| 5,721,788 A | 2/1998 | Powell et al. |
| 5,734,119 A | 3/1998 | France |
| 5,734,752 A | 3/1998 | Knox |
| 5,742,845 A | 4/1998 | Wagner |
| 5,745,604 A | 4/1998 | Rhoads |
| 5,748,783 A | 5/1998 | Rhoads |
| 5,760,386 A | 6/1998 | Ward |
| 5,761,686 A | 6/1998 | Bloomberg |
| 5,765,152 A | 6/1998 | Erickson |
| 5,765,176 A | 6/1998 | Bloomberg |
| 5,768,426 A | 6/1998 | Rhoads |
| 5,774,452 A | 6/1998 | Wolosewicz |
| 5,778,102 A | 7/1998 | Sandford, II et al. |
| 5,786,587 A | 7/1998 | Colgate, Jr. |
| 5,790,703 A | 8/1998 | Wang |
| 5,801,687 A | 9/1998 | Peterson |
| 5,804,803 A | 9/1998 | Cragun et al. |
| 5,809,139 A | 9/1998 | Girod et al. |
| 5,809,317 A | 9/1998 | Kogan |
| 5,818,441 A | 10/1998 | Throckmorton |
| 5,825,892 A | 10/1998 | Braudaway et al. |
| 5,828,325 A | 10/1998 | Wolosewicz et al. |
| 5,841,886 A | 11/1998 | Rhoads |
| 5,841,978 A | 11/1998 | Rhoads |
| 5,845,281 A | 12/1998 | Benson |
| 5,848,413 A | 12/1998 | Wolff |
| 5,848,424 A | 12/1998 | Scheinkman |
| 5,852,673 A | 12/1998 | Young |
| 5,857,038 A | 1/1999 | Owada et al. |
| 5,862,260 A | 1/1999 | Rhoads |
| 5,864,622 A | 1/1999 | Marcus |
| 5,869,819 A | 2/1999 | Knowles |
| 5,871,615 A | 2/1999 | Harris |
| 5,872,589 A | 2/1999 | Morales |
| 5,875,249 A | 2/1999 | Mintzer et al. |
| 5,892,900 A | 4/1999 | Ginter et al. |
| 5,893,910 A | 4/1999 | Martineau |
| 5,900,608 A | 5/1999 | Iida |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles et al. |
| 5,905,800 A | 5/1999 | Moskowitz et al. |
| 5,913,210 A | 6/1999 | Call |
| 5,915,027 A | 6/1999 | Cox et al. |
| 5,918,213 A | 6/1999 | Bernard et al. |
| 5,918,214 A | 6/1999 | Perkowski |
| 5,920,861 A | 7/1999 | Hall |
| 5,920,878 A | 7/1999 | DeMont |
| 5,926,822 A | 7/1999 | Garman |
| 5,930,377 A | 7/1999 | Powell et al. |
| 5,930,767 A | 7/1999 | Reber et al. |
| 5,932,863 A | 8/1999 | Rathus |
| 5,933,829 A | 8/1999 | Durst et al. |
| 5,938,726 A | 8/1999 | Reber et al. |
| 5,938,727 A | 8/1999 | Ikeda |
| 5,939,695 A | 8/1999 | Nelson |
| 5,939,699 A | 8/1999 | Perttunen et al. |
| 5,940,595 A | 8/1999 | Reber et al. |
| 5,949,055 A | 9/1999 | Fleet et al. |
| 5,950,173 A | 9/1999 | Perkowski |
| 5,963,916 A | 10/1999 | Kaplan |
| 5,969,324 A | 10/1999 | Reber et al. |
| 5,971,277 A | 10/1999 | Cragun et al. |
| 5,974,141 A | 10/1999 | Saito |
| 5,974,548 A | 10/1999 | Adams |
| 5,978,773 A | 11/1999 | Hudetz et al. |
| 5,979,757 A | 11/1999 | Tracy et al. |
| 5,979,941 A * | 11/1999 | Mosher et al. ............ 283/67 |
| 5,983,218 A | 11/1999 | Suyeda-Mahmoo |
| 5,991,876 A | 11/1999 | Johnson |
| 6,024,287 A | 2/2000 | Takai et al. |
| 6,052,486 A | 4/2000 | Knowlton et al. |
| 6,064,764 A | 5/2000 | Bhaskaran et al. |
| 6,101,602 A | 8/2000 | Fridrich |
| 6,122,403 A | 9/2000 | Rhoads |
| 6,131,161 A | 10/2000 | Linnartz |
| 6,138,151 A | 10/2000 | Reber et al. |
| 6,157,330 A | 12/2000 | Bruekers et al. |
| 6,163,842 A | 12/2000 | Barton |
| 6,185,312 B1 | 2/2001 | Nakamura et al. |
| 6,185,316 B1 | 2/2001 | Buffam |
| 6,199,048 B1 | 3/2001 | Hudetz et al. |
| 6,205,249 B1 | 3/2001 | Moskowitz |
| 6,219,439 B1 | 4/2001 | Burger |
| 6,243,480 B1 | 6/2001 | Zhao et al. |
| 6,256,736 B1 | 7/2001 | Coppersmith et al. |
| 6,285,776 B1 | 9/2001 | Rhoads |
| 6,286,036 B1 | 9/2001 | Rhoads |
| 6,286,761 B1 | 9/2001 | Wen |
| 6,289,108 B1 | 9/2001 | Rhoads |
| 6,292,092 B1 | 9/2001 | Chow et al. |
| 6,311,214 B1 | 10/2001 | Rhoads |
| 6,314,457 B1 | 11/2001 | Schena et al. |
| 6,321,981 B1 | 11/2001 | Ray et al. |
| 6,324,573 B1 | 11/2001 | Rhoads |
| 6,325,420 B1 | 12/2001 | Zhang et al. |
| 6,332,031 B1 | 12/2001 | Rhoads et al. |
| 6,334,721 B1 | 1/2002 | Horigane |
| 6,343,138 B1 | 1/2002 | Rhoads |
| 6,354,630 B1 | 3/2002 | Zhang et al. |
| 6,385,330 B1 | 5/2002 | Powell et al. |
| 6,389,151 B1 | 5/2002 | Carr et al. |
| 6,424,725 B1 | 7/2002 | Rhoads et al. |
| 6,487,301 B1 | 11/2002 | Zhao |
| 2001/0001854 A1 | 5/2001 | Schena et al. |
| 2001/0005837 A1 | 6/2001 | Kojo |
| 2001/0006585 A1 | 7/2001 | Horigane |
| 2001/0007975 A1 | 7/2001 | Nyberg, Jr. et al. |
| 2001/0023421 A1 | 9/2001 | Numao et al. |
| 2001/0037309 A1 | 11/2001 | Vrain |
| 2001/0037313 A1 | 11/2001 | Lofgren et al. |
| 2001/0037455 A1 | 11/2001 | Lawandy et al. |
| 2001/0040980 A1 | 11/2001 | Yamaguchi |

| | | | |
|---|---|---|---|
| 2001/0047426 | A1 | 11/2001 | Hunter |
| 2001/0054149 | A1 | 12/2001 | Kawaguchi et al. |
| 2001/0056468 | A1 | 12/2001 | Okayasu et al. |
| 2002/0012446 | A1 | 1/2002 | Tanaka |
| 2002/0023218 | A1 | 2/2002 | Lawandy et al. |
| 2002/0037093 | A1 | 3/2002 | Murphy |
| 2002/0051162 | A1 | 5/2002 | Kawaguchi et al. |
| 2002/0072989 | A1 | 6/2002 | Van De Sluis |
| 2002/0077983 | A1 | 6/2002 | Tagashira |
| 2002/0080271 | A1 | 6/2002 | Eveleens et al. |
| 2002/0114013 | A1 | 8/2002 | Hyakutake et al. |

FOREIGN PATENT DOCUMENTS

| | | |
|---|---|---|
| EP | 058 482 | 8/1982 |
| EP | 372 601 | 6/1990 |
| EP | 411 232 | 2/1991 |
| EP | 441 702 | 8/1991 |
| EP | 493 091 | 7/1992 |
| EP | 581 317 | 2/1994 |
| EP | 629 972 | 12/1994 |
| EP | 650146 | 4/1995 |
| EP | 705 025 A2 | 4/1996 |
| EP | 642 060 B1 | 4/1999 |
| EP | 1117246 | 7/2001 |
| EP | 1134710 | 9/2001 |
| EP | 1152592 | 11/2001 |
| EP | 1173001 | 1/2002 |
| GB | 2063018 | 5/1981 |
| GB | 2067871 | 7/1981 |
| GB | 2196167 | 4/1988 |
| GB | 2204984 | 11/1988 |
| GB | 2325765 | 12/1998 |
| JP | 3-185585 | 8/1991 |
| JP | 3185585 | 8/1991 |
| JP | 4-248771 | 9/1992 |
| JP | 5-242217 | 9/1993 |
| JP | 7115474 | 5/1995 |
| JP | 8050598 | 2/1996 |
| JP | 10171758 | 6/1998 |
| JP | 10177613 | 6/1998 |
| WO | WO 89/08915 | 9/1989 |
| WO | WO 94/27228 | 11/1994 |
| WO | WO 95/10835 | 4/1995 |
| WO | WO 95/14289 | 5/1995 |
| WO | WO 95/20291 | 7/1995 |
| WO | WO 96/26494 | 8/1996 |
| WO | WO 96/27259 | 9/1996 |
| WO | WO 96/36163 | 11/1996 |
| WO | WO 97/43736 | 11/1997 |
| WO | WO 98/14887 | 4/1998 |
| WO | WO 98/20642 | 5/1998 |
| WO | WO 98/24050 | 6/1998 |
| WO | WO 98/40823 | 9/1998 |
| WO | WO 98/49813 | 11/1998 |
| WO | WO 99/34277 | 7/1999 |
| WO | WO 01/08405 | 2/2001 |
| WO | WO 01/43080 | 6/2001 |
| WO | WO 01/75629 | 10/2001 |
| WO | WO 01/97175 | 12/2001 |
| WO | WO 02/03328 | 1/2002 |
| WO | WO 02/25599 | 3/2002 |
| WO | WO 02/27618 | 4/2002 |
| WO | WO 02/27720 | 4/2002 |

OTHER PUBLICATIONS

U.S. Appl. No. 60/158,015, filed Oct. 6, 1999, Davis et al.

U.S. Appl. No. 60/356,881, filed Feb. 12, 2002, Hannigan et al.

U.S. Appl. No. 09/287,940, filed Apr. 7, 1999, Rhoads.

U.S. Appl. No. 09/314,648, filed May 19, 1999, Rodriguez et al.

U.S. Appl. No. 09/342,688, filed Jun. 29, 1999, Rodriguez et al.

U.S. Appl. No. 09/342,971, filed Jun. 29, 1999, Rhoads et al.

U.S. Appl. No. 09/342,689, filed Jun. 29, 1999, Rhoads.

U.S. Appl. No. 09/343,104, filed Jun. 29, 1999, Rodriguez et al.

U.S. Appl. No. 09/452,022, filed Nov. 30, 1999, Alattar et al.

U.S. Appl. No. 09/452,023, filed Nov. 30, 1999, Rhoads.

U.S. Appl. No. 09/503,881, filed Feb. 14, 2000, Rhoads et al.

U.S. Appl. No. 09/531,076, filed Mar. 18, 2000, Rhoads et al.

U.S. Appl. No. 09/547,664, filed Apr. 12, 2000, Rhoads et al.

U.S. Appl. No. 09/562,517, filed May 1, 2000, Davis et al.

U.S. Appl. No. 09/571,422, filed May 15, 2000, Rhoads et al.

U.S. Appl. No. 09/631,409, filed Aug. 3, 2000, Brundage et al.

U.S. Appl. No. 09/679,261, filed Oct. 4, 2000, Davis et al.

U.S. Appl. No. 09/858,189, filed May 14, 2001, Rhoads et al.

U.S. Appl. No. 10/027,783, filed Dec. 19, 2001, Brunk et al.

U.S. Appl. No. 09/629,401, filed Aug. 1, 2000, Seder et al.

U.S. Appl. No. 09/923,762, filed Aug. 6, 2001, Lofgren et al.

U.S. Appl. No. 10/094,593, filed Mar. 6, 2002, Hannigan et al.

U.S. Appl. No. 10/172,769, filed Jun. 14, 2002, Miller et al.

U.S. Appl. No. 10/154,621, filed May 22, 2002, Miller.

"Access Control and COpyright Protection for Images, Conditional Access and Copyright Protection Based on the Use of Trusted Third Parties," 1995, 43 pages.

"Access Control and Copyright Protection for Images, WorkPackage 8: Watermarking," Jun. 30, 1995, 46 pages.

"Access Control and Copyright Protection for Images, Work Package 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

Arachelian, "White Noise Storm," Apr. 11, 1994, Internet reference, 13 pages.

Arthur, "Digital Fingerprints Protect Artwork," New Scientist, Nov. 12, 1994, p. 24.

Bender et al., "Techniques for Data Hiding," Massachusetts Institute of Technology, Media Laboratory, Jan. 1995, 10 pages.

Boland et al, "Watermarking Digital Images for Copyright Protection," Fifth International Conference on Image Processing and its Applications, Conference Date Jul. 4–6, 1995, Conf. Publ. No. 410, pp. 326–330.

Boneh, "Collusion–Secure Fingerprinting for Digital Data," Department of Computer Science, Princeton University, 1995, 31 pages.

Bovik, "Handbook of Image and Video Processing," Academic Press, 2000, pp. 133–136, 154, 155.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

Brown, "S–Tools for Windows, Version 1.00, .COPYRGT.1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

Caronni, "Assuring Ownership Rights for Digital Images," Published in the Proceedings of 'Reliable It Systems,' vis '95, HH. Bruggemann and W. Gerhardt–Hackl (Ed.), Vieweg Publishing Company, Germany, 1995, Jun. 14, 1994, 10 pages.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Machine, Jun. 1994, 18 pages.

Clarke, "Invisible Code Tags Electronic Images," Electronic Engineering Times, Jun. 12, 1995, n. 852, p. 42.

Collins et al., "Using Bar Code—Why It's Taking Over", Second Edition, Data Capture Institute, 1990 (Contents & Index).

"The Copyright Can of Worms Opened Up By The New Electronic Media," Computergram Internations, pCGN07170006, Jul. 17, 1995, and The Copyright Can of Worms Opened Up By the New Electronic Media–2, Computergram Internations, pCGN07210008, Jul. 21, 1995, 3 pages.

"Copyright Protection for Digital Images, Digital Fingerprinting from FBI;" Highwater FBI brochure, 1995, 4 pages.

"Cyphertech Systems: Introduces Digital Encoding Device to Prevent TV Piracy," Hollywood Reporter, Oct. 20, 1993, p. 23.

Dautzenberg, "Watermarking Images," Department of Microelectronics and Electrical Engineering, Trinity College Dublin, 47 pages, Oct. 1994.

Fitzgerald, "Invisible Digital Copyright ID," Editor & Publisher, Jun. 25, 1994, p. 62.

"Foiling Card Forgers With Magnetic 'Noise,'" Wall Street Journal, Feb. 8, 1994.

Friedman, "The Trustworthy Digital Camera: Restoring Credibility to the Photographic Image," IEEE Transactions on Consumer Electronics, vol. 39, No. 4, Nov., 1993, pp. 905–910.

Grieco, Jr. et al., "Behind Bars—Bar Coding Principles and Applications", PT Publication, Inc., 1989 (Table of Contents & Index).

Hecht, "Embedded Data Glyph Technology for Hardcopy Digital Documents," SPIE vol. 2171, Feb. 1994, pp. 341–352.

"High Water FBI Limited Presentation Image Copyright Protection Software," FBI Ltd brochure, Jul., 1995, 17 pages.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

JPEG Group's JPEG Software (release 4), FTP.CSU-A.Berekeley.EDU/PUB/CypherPunks/Applications/JSTEG/JPEG.Announcement.GZ, Jun. 7, 1993, 2 pages.

Kassam, Signal Detection in Non–Gaussian Noise, Dowden & Culver, 1988, pp. 1–96.

Kawaguchi et al. "Principle and Applications of BPCS–Steganography" Proc. SPIE vol. 3528: Multimedia Systems and Applications 2–4 Nov 1998 pp. 464–473.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Komatsu et al. "A Proposal on Digital Watermarking in Document Image Communication and its Application to Realizing a Signature" Electronics and Communications in Japan Part I vol. 73 No. 5 1990 pp. 22–23.

Komatsu et al. "Authentication System Using Concealed Image in Telematics" Memoirs of the School of Science & Engineering Waseda Univ. No. 52 1988 pp. 45–60.

Komatsu et al., "Authentication System Using Concealed Image in Telematics," Memoirs of the School. of Science & Engineering, Waseda Univ., No. 52, 1988, pp. 45–60.

Kurak et al., "A Cautionary Note On Image Downgrading," 1992 IEEE, pp. 153–159.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matsui et al., "Video–Steganography: How to Secretly Embed a Signature in a Picture," IMA Intellectual Property Project Proceedings, Jan. 1994, vol. 1, Issue 1, pp. 187–205.

Matthews, "When Seeing is Not Believing," New Scientist, Oct. 16, 1993, pp. 13–15.

Mintzer et al., "Safeguarding Digital library Contents and Users" Digital Watermarking, D–Lib Magazine, Dec. 1997: ISSN 1082–9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318–326.

"NAB—Cyphertech Starts Anti–Piracy Broadcast Tests," Newsbytes, NEW03230023, Mar. 23, 1994.

Nakamura et al., "A Unified Coding Method of Dithered Image and Text Data Using Micropatterns," Electronics and Communications in Japan, Part 1, vol. 72, No. 4, 1989, pp. 50–56.

Nakamura et al., "A Unified Coding Method of Image and Text Data Using Discrete Orthogonal Transform," Systems and Computers in Japan, vol. 21, No. 3, 1990, pp. 87–92.

Palmer, "The Bar Code Book", Third Edition, Helmers Publishing, Inc., 1995 (Contents & Index).

Pennebaker et al., JPEG Still Image Data Compression Standard, Chapter 3, "Aspects of the Human Visual System," pp. 23–27, 1993, Van Nostrand Reinhold, New York.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. on Information Theory, vol. 8, No. 2, Feb., 1962, pp. 145–154.

Sanford II, et al., "The Data Embedding Method," SPIE vol. 2615, Oct. 23, 1995, pp. 226–259.

Sapwater et al., "Electronic Copyright Protection," PHOTO>Electronic Imaging, vol. 37, No. 6, 1994, pp. 16–21.

Schneler, "Digital Signatures, Cryptographic Algorithms Can Create Nonforgeable Signatures for Electronic Documents, Making Them Valid Legal Instruments" BYTE, Nov. 1993, pp. 309–312.

Schreiber et al., "A Compatible High–Definition Television System Using the Noise–Margin Method of Hiding Enhancement Information," SMPTE Journal, Dec. 1989, pp. 873–879.

Shaggy@phantom.com, "Hide and Seek v. 4.0," Internet reference, Apr. 10, 1994, 3 pages.

Sheng et al., "Experiments on Pattern Recognition Using Invariant Fourier–Mellin Descriptors," Journal of Optical Society of America, vol. 3, No. 6, Jun., 1986, pp. 771–776.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Szepanski "A Signal Theoretic Method for Creating Forgery–Proof Documents For Automatic Verification" 1979 Camahan Conference on Crime Countermeasures University of Kentucky Lexington Kentucky May 16–18, 1979.

Tanaka et al., "A Visual Retrieval System with Private Information for Image Database," Proceeding International Conference on DSP Applications and Technology, Oct. 1991, pp. 415–421.

Tanaka et al., "Embedding Secret Information Into a Dithered Multi–Level Image," IEEE Military Comm. Conf., Sep. 1990, pp. 216–220.

Tanaka et al., "New Integrated Coding Schemes for Computer–Aided Facsimile," Proc. IEEE int'l Conf. on Sys. Integration, Apr. 1990, pp. 275–281.

Tanaka, "Embedding the Attribute Information Into a Dithered Image," Systems and Computers in Japan, vol. 21, No. 7, 1990, pp. 43–50.

Tirkel et al, "Electronic Water Mark," DICTA–93, Macquarie University, Sydney, Australia, Dec., 1993, pp. 666–673.

Toga et al., "Registration Revisited," Journal of Neuroscience Methods, 48 (1993), pp. 1–13.

Van Schyndel et al., "A Digital Watermark," IEEE International Conference on Image Processing, Nov. 13–16, 1994, pp. 86–90.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

Weber et al., "Correlative Image Registration," Seminars in Nuclear Medicine, vol XXIV, No. 4, Oct., 1994, pp. 311–323.

Wise, "The History of Copyright, Photographers' Rights Span Three Centuries," PHOTO>Electronic Imaging, vol. 37, No. 6, 1994.

Amano, "A Feature Calibration Method for Watermarking of Document Images," Proc. $5^{th}$ Int. Conf. on Document Analysis and Recognition, Sep., 1999, pp. 91–94.

Bloomberg, "Embedding Digital Data on Paper in Iconic Text" SPIE vol. 3027, Document Recognition IV, pp. 67–80 (1997).

Dittman, et al., "Hologram Watermarks for Document Authentications," pp. 60–64, Int. Conference on Information Technology: Coding and Computing (ITCC 2001).

Johnson, et al., "Bridging the Paper and Electronic Worlds: The Paper User Interface", Interchi '93, pp. 507–512, Apr. 1993.

Knox, "Digital Watermarks Using Stochastic Screens," SPIE, vol. 3018, Apr., 1997, pp. 316–322.

Newman, William, et al. "A Desk Supporting Computer- –Based Interaction with paper Documents," ACM Conference on Human Factors in Computing Systems (CHI '92) May 3–7, 1992, pp. 587–592.

Peairs, "Iconic Paper," Proceedings of the Third International Conference on Document Analysis and Recognition (ICDAR '95), pp. 1174–1179, 1995.

Rao, et al. "Protofoil: Storing and Finding the Information Worker's Paper Documents in an Electric File Cabinet," Human Factors in Computing Systems (CHI '94), pp. 180–186, Boston, MA, Apr. 1994.

Seybold, "Holographic signatures for digital images," *The Seybold Report on Desktop Publishing*, Aug. 1995, one page.

Vielhauer, et al., "Approaches to Biometric watermarks for owner auethentification," Security and Watermarking of Multimedia Contents III, Ping Wah Wong, Edward J. Delp III, Editors, Proceedings of SPIE vol. 4314 (2001).

Whittaker, et al., "Back to the Future: Pen and Paper Technology Supports Complex Group Coordination," CHI '95, Conference on Human Factors in Computing Systems, Denver, Colorado (May 7–11, 1995) (text copy obtained from ACM).

* cited by examiner

LINKING DOCUMENTS THROUGH DIGITAL WATERMARKING

RELATED APPLICATION DATA

The present application is a continuation in part of U.S. patent application Ser. No. 10/094,593, filed Mar. 6, 2002. The present application also claims the benefit of U.S. Provisional Application No. 60/356,881, filed Feb. 12, 2002.

The present invention also relates to assignee's U.S. Pat. No. 6,332,031 (issued on Dec. 18, 2001).

Each of the above-mentioned patent documents is herein incorporated by reference.

TECHNICAL FIELD

The present invention relates to steganography and digital watermarking.

BACKGROUND AND SUMMARY

Digital watermarking technology, a form of steganography, encompasses a great variety of techniques by which plural bits of digital data are hidden in some other object, preferably without leaving human-apparent evidence of alteration.

Digital watermarking may be used to modify content to embed a machine-readable code into the media content. The content may be modified such that the embedded code is imperceptible or nearly imperceptible to the user, yet may be detected through an automated detection process.

Digital watermarking systems typically have two primary components: an embedding component that embeds the watermark in the media content, and a reading component that detects and reads the embedded watermark. The embedding component embeds a watermark pattern, e.g., by altering or adding data samples of the media content. The reading component analyzes content to detect whether a watermark pattern is present. In applications where the watermark encodes information, the reading component extracts this information from the detected watermark. Assignee's U.S. patent application Ser. No. 09/503,881, filed Feb. 14, 2000, discloses various encoding and decoding techniques. U.S. Pat. Nos. 5,862,260 and 6,122,403 disclose still others. Each of these U.S. patent documents is herein incorporated by reference.

While a digital watermark is typically applied to digital content, it may be implemented so as to remain with the content even through transformations to and from the analog domain. In addition to images, watermarking applies to a variety of different media types, including audio and video. Watermarking can also be applied to ordinary media, whether or not it conveys information. Examples include paper, plastics, laminates, product labels and packaging, paper/film emulsions, etc. A watermark can embed a single bit of information, or any number of bits, line an identifier or payload.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms and conventional paper watermarks.

One aspect of the present invention links documents through digital watermarking. A first document includes a first identifier embedded as a first digital watermark component. The first digital watermark is decoded to obtain the first identifier. The first identifier is altered to provide a second identifier. The second identifier and the first identifier, however, remain related. The second digital watermark is embedded in a second document as a component of a second digital watermark. The second identifier can be extracted from the second document.

Another aspect of the present invention focuses on documents that are subjected to multiple printing stages. A first digital watermark component is embedded during a first printing stage, and a second digital watermark component is embedded during a later printing stage.

Further features and advantages will become even more apparent with reference to the following detailed description and accompanying drawings.

DETAILED DESCRIPTION

Linking Documents with Digital Watermarks

Documents can be linked together, and to a bearer/creator, through secure indicia on an identification document and subsequently issued documents.

An individual (hereafter "bearer") possesses an identification document. The identification document may include a driver's license, passport, government issued identification document, security badge, etc., etc. The identification document preferably includes a photographic and/or a biometric representation of the bearer of the identification document. The biometric representation may include a fingerprint, retinal scan, voice print, facial recognition map, DNA coding, etc. The biometric representation may be printed or embedded in the identification document (e.g., encoded in a 2-D barcode or embedded as a digital watermark) or stored in electronic memory circuitry (as is provided by a so-called Smart Card). The photographic and/or biometric representation offers a layer of security, as it can be checked against the document bearer.

A digital watermark is embedded in the identification document. The digital watermark includes an identifier (or payload).

Figure 1:
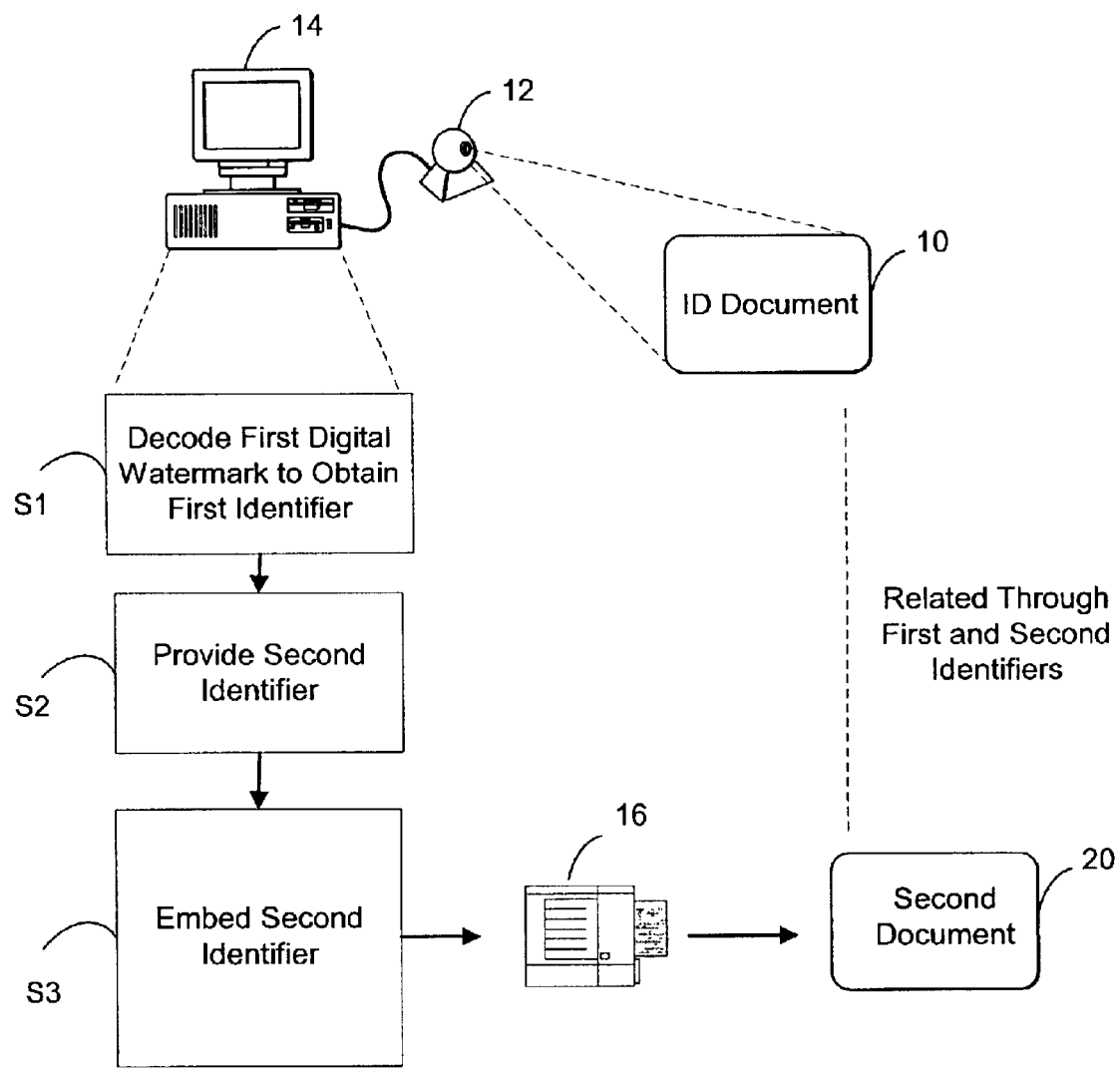
FIG. 1 is a diagram illustrating document linking with digital watermarking.

With reference to FIG. 1, the bearer presents the identification document 10 to a document issuer as is customary, e.g., at an airline check-in counter. An input device 12 captures an image of the identification document 10. Input device 12 may include a digital camera, optical sensor, web camera, CCD array, scanner, 2-D bar code reader, etc. The captured imagery is communicated to a computing device 14. We note that while input device 12 is illustrated as being physically tethered to the computing device 14, the present invention is not so limited. Instead, input device 12 may wirelessly communicate with computer device 14. Of course input device 12 may communicate with computing device 14 through a network such as the internet, LAN, WAN, etc. Or input device 12 may store captured imagery to a disk or flash memory card, which can be read by computing device 14. Computer device 14 may take a variety of forms, including a general purpose computer, hand held device, scanning pen, 2-D bar code reader, network computer, distributed computers, etc. Computing device 14 preferably includes system memory and electronic processing circuitry (e.g., CPU). The processing circuitry communicates with the system memory via a system bus.

A digital watermark detector analyzes the captured imagery to detect and decode the first digital watermark. The digital watermark detector typically includes software instructions that reside in the computing device's 14 system memory. The software instructions execute on the electronic processing circuitry. The digital watermark detector decodes the first digital watermark to obtain the identifier (step S1). For clarity, we refer to the decoded digital watermark identifier as a "first identifier."

A second identifier is provided (step S2). This second identifier will be embedded in a second document as a second digital watermark component. The second identifier can be provided in a number of ways. Yet, regardless of the providing technique, the first and second identifiers are preferably related. In one implementation, the second identifier is a copy of the first identifier. But to prevent someone from merely copying the first watermark identifier from the ID document to some fake second document, it is useful to alter the first identifier in some way that maintains a relationship between the two documents but does not yield the same watermark identifier.

The alteration may include a cryptographic permutation of the first identifier. The second identifier then comprises this permutation. Or the alternation may include setting an identifier bit(s) to indicate that the second identifier is a child of the first identifier. Still further, the alternation may include adding additional data to the first identifier and then embedding the augmented first identifier as the second identifier. Still further, the second identifier may be randomly or pseudo-randomly chosen. A database or data record can be used to associate the randomly (or pseudo-randomly) chosen second identifier with the first identifier.

In other cases, the first identifier includes a first set of information and the second identifier includes a second set of information. The first and second sets are preferably related. For example, the first set may include a key that unlocks, decrypts or otherwise decodes the second set. Or the first set may include some personal data (e.g., bearer's first name) while the second set includes related personal data (e.g., bearer's last name).

The second identifier is embedded in a second document 20 (step S3). The second document 20 may include a boarding pass, transportation ticket, baggage tag or receipt, event ticket, printed document, envelope, invitation, security badge, etc., etc. The second document 20 is printed with a printer 16. (We note that in an alternative, but related implementation, the second document can be retained in electronic form. The electronic form includes the digital watermark. The embedded electronic form can be transferred to, e.g., a handheld device for later verification.).

It should be appreciated that the present invention is not limited to having the embedding step S3 carried out by computing device 14. Indeed, once obtained the second identifier can be embedded by another computing device, which communicates the embedded information to printer 16. Also, many of today's printers include sophisticated computing capability, so printer 16 could alternatively carry out embedding step S3. Additionally, a device other than computing device 14 can carry out the provision of a second identifier (i.e., step S2).

The identification document 10 and second document 20 are linked through the two digital watermark identifiers. In particular, the identification document's 10 first identifier and the second document's 20 second identifier are related (also referred to as "linked"). Such a relationship enables an additional layer of verification when the bearer presents the identification document 10 and the second document 20, e.g., to board a plane, access a secure location, etc., etc.

Figure 2:
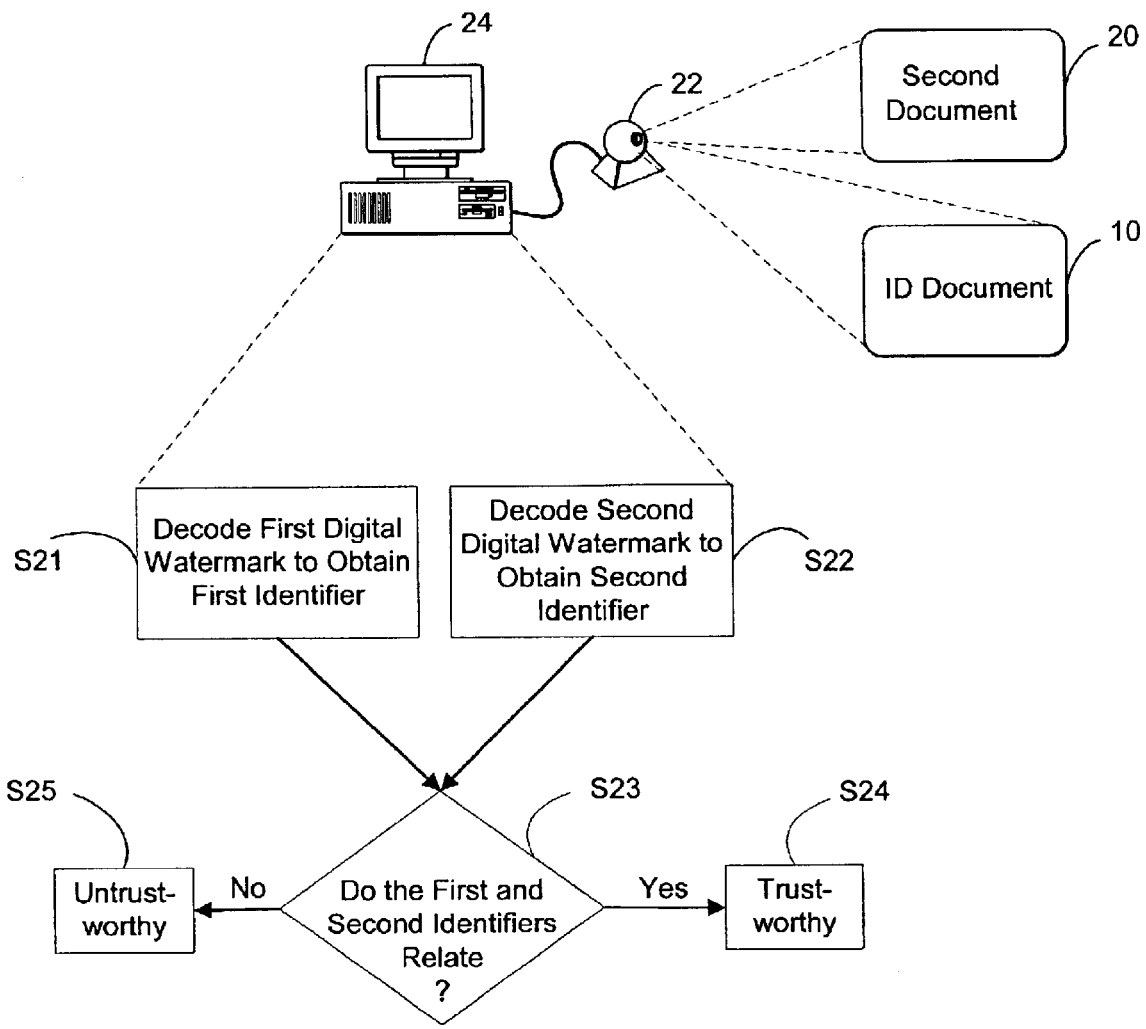
FIG. 2 is a diagram illustrating an authentication process for documents linked according to the FIG. 1 process.

With reference to FIG. 2, the bearer presents the identification document 10 and the second document 20 to an input device 22. The input device 22 may be located at a boarding gate, secured access point, event entrance, etc. The captured imagery is communicated to a computing device 24. The computing device 24 includes a digital watermark detector. The digital watermark detector decodes the first and second digital watermarks embedding in the captured imagery of documents 10 and 20 to obtain the first and second identifiers (steps S21 and S22). The order of the presentment and decoding is not critical, unless one of the identifiers is used to decode, find or decrypt the other identifier. The computing device 24 (e.g., via software executing on computer device 24) determines whether the first and second identifiers relate or otherwise coincide (step S23). For example, the various identifier relationships or alterations discussed above can be explored. The second document is considered trustworthy when the two identifiers are related (step S24). Otherwise, the second document is considered untrustworthy (step S25).

Our inventive concepts apply to other forms of printable secure indicia, like some types of bar codes and scrambled indicia. For example, the identification document may include an embedded digital watermark identifier, but the second document includes a second identifier in the form of a secure 2-D bar code. We can even extend this to other machine-readable codes, but these codes should be readable from the identification document and then be writable to the second document that is issued. Some examples include magnetic strip readers and writers, smart cards, etc. We note, however, that the inherent characteristics of a digital watermark make the digital watermark a much-preferred solution.

Our inventive system and methods for linking documents also provide a solution for home printing of say tickets and boarding passes. For example, a user presents her photo ID to a home computer. A first digital watermark identifier is extracted from the photo ID, perhaps altered and is then embedded as a second identifier in tickets printed on a home printer. The embedded ticket is then verified at an airport gate using the FIG. 2 method.

It should be appreciated that this aspect of the present invention applies to many other types of documents. For example, consider an office setting where related papers or charts are linked. Or a receipt can be linked to a credit card that is used for a purchase evidenced by the receipt. Still further, medical records can be linked to insurance cards or patient ID tags (or wristbands). Or newborn baby arm tags can be linked to tags worn by their mothers and fathers. Traveler's checks can be linked to a bearer's documentation. The possibilities are many.

Multiple Watermark Components

There are many situations in which a document is subjected to multiple printing stages, using perhaps different printing processes or printers. Consider a birth certificate for example. A birth certificate is initially printed using a high quality printing process (e.g., an offset printing process or dye diffusion printing process, silk screening, lithography, ink jet, flexography, letter press, etc., etc.). This initial printing process prints so-called "fixed" information, like generic text, designs, lines, state seal, etc. This type of printing can be labor intensive and expensive. Yet this high quality printing provides a favorable channel for embedding a robust digital watermark component.

The birth certificate is later printed with so-called "variable" information, like a baby's name, date and location of birth, etc. This variable information personalizes the birth certificate to a new child. A relatively low quality printing process (e.g., laser jet or ink jet printer, etc.) typically carries out this second printing. This low quality printing process may not always be conducive to robust watermark embedding.

One aspect of the present invention provides a watermark embedding technique that capitalizes on these different types of printing environments—a high quality printing process and a low quality, but perhaps faster, printing process. In particular, a first digital watermark component is embedded during an initial printing stage, while a second digital watermark component is embedded during a later printing stage.

Figure 3:
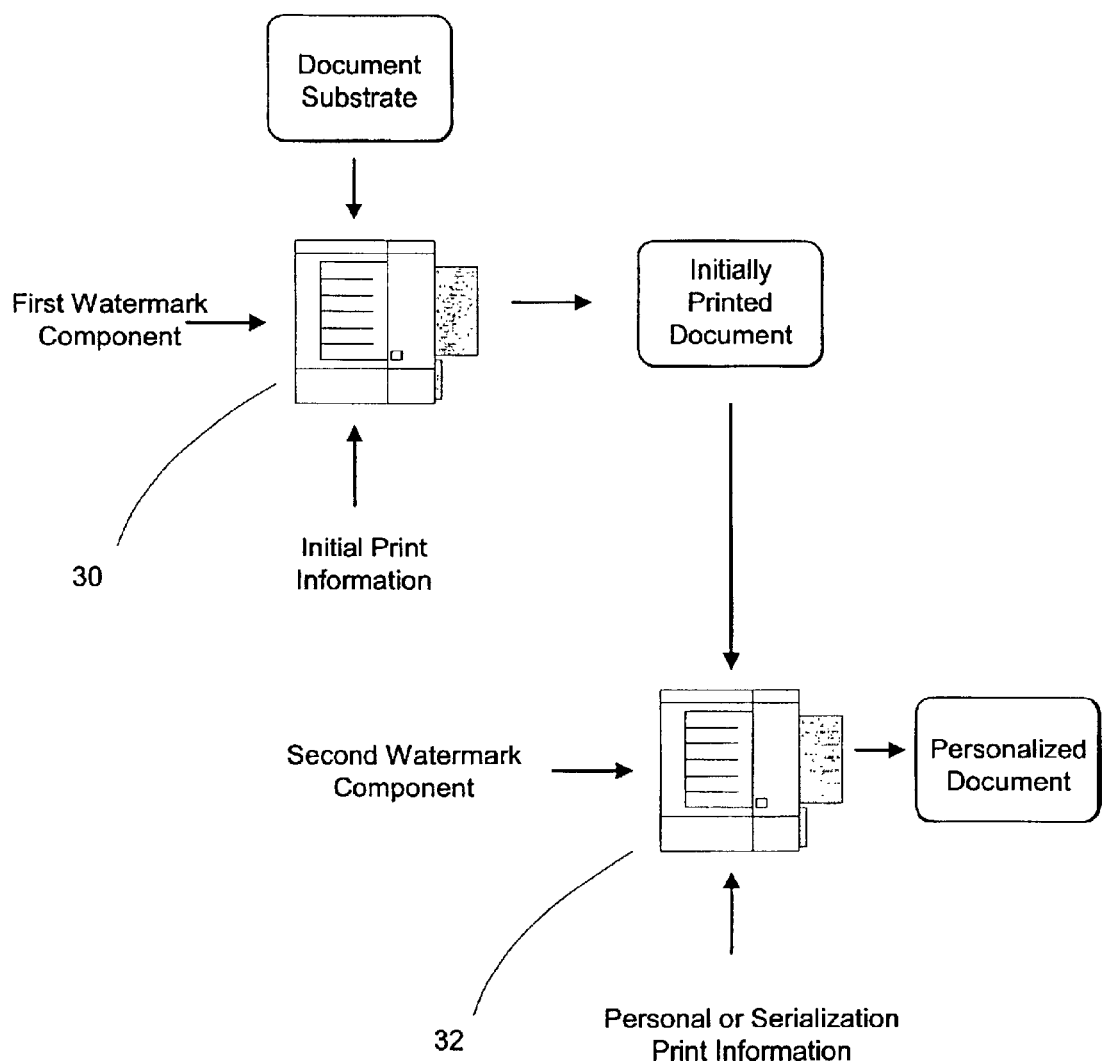
FIG. 3 is a diagram illustrating multi-stage printing and watermark embedding.

Consider FIG. 3. A high quality printing process 30 is used to initially print a document substrate. Although not separately illustrated, printing process 30 may include both a computing device and a printing device or process. Printing process 30 receives as inputs initial print information and a first digital watermark component. We note that in some implementations the first digital watermark is embedded in the initial print information (or an image of such), and the embedded initial print information is provided to printing process 30. Printing process 30 applies the initial print information and the first digital watermark component to the document substrate. As discussed above, this initial printing stage is typically used to print fixed information, artwork and/or designs on the document substrate.

The initially printed document is subjected to a later printing process 32. Although not separately illustrated, printing process 32 may include both a computing device and a printing device or process. The printing process 32 receives as inputs personal information (e.g., so-called variable information) and a second digital watermark component. Of course, the second digital watermark component can be embedded in the personal information (or an image of such), and the embedded personal information is then provided to the later printing process 32. The printing process 32 applies the personal information and the second digital watermark component to the initially printed document to produce a personalized document.

We now provide digital watermark component details for each of the initial printing stage (e.g., printing process 30) and the later printing stage (e.g., printing process 32).

Initial Printing Stage

In a first implementation a first digital watermark component includes a so-called grid or orientation component (see, e.g., assignee's patent application Ser. Nos. 10/154,621 and 09/503,881). An orientation component is helpful in resolving image distortion such as rotation, scale and translation. Proper image orientation is sometimes helpful when decoding a watermark payload or message. In some cases the orientation component identifies an image reference point or origin. A watermark detector may use the reference point or origin to improve message or payload detection.

In another implementation, the first digital watermark component includes an identifier. The identifier may be in the form of an embedded payload, message bit(s) or may even be reflected by a type or format of an orientation component. The identifier can carry information such as fixed information that is printed on the document. Or the identifier may include information such as a batch run number, printer location, identification number, expected distribution channel, etc. The identifier alternatively may indicate the type of document in which it is embedded in, e.g., signaling that a document is an identification document or boarding pass.

The identifier may also carry information that provides decoding clues to help resolve a second digital watermark component. In one case the clue points to where the second digital watermark should be located or embedded in the document. (E.g., consider an identification document in which the clue indicates that the second digital watermark is embedded in a photograph or region with a variance or local contrast level above a certain threshold.). In another case a clue provides a decryption or decoding key for decrypting or decoding the second digital watermark. In still another case the clue indicates which message protocol is used for forming or embedding the second digital watermark component.

The identifier may also signal to a watermark detector that the document is embedded with a second digital watermark component. This may encourage the watermark detector to continue searching for the second digital watermark component. This aspect of the present invention may also be used for authentication purposes. For example, consider a batch of identification documents (or document substrates) that are misappropriated after initial printing, but before personalization. The initial printing embeds a first digital watermark component including an identifier. The identifier carries information indicating that a second digital watermark component is expected. An authentication process then requires detection and successful decoding of the second digital watermark component before the identification document is considered trusted. In the case of a misappropriated identification document, a forgery process used to personalize the misappropriated identification document may not include a second digital watermark component, or if it does include such a component, it might not properly relate to the identifier's clue.

The identifier may also include a pointer or link to a data record. The pointer may be used as an index to interrogate a database to retrieve the data record. The data record includes information regarding the type of watermark embedding, the type of document in which the pointer is embedded, and/or characteristics regarding the second digital watermark. The data record may also include tell-tale signs about the document or second watermark component embedding, e.g., like image locations, areas of high noise, document areas unlikely to include a watermark signal, watermark message protocol, etc. The second watermark detector can use these tell-tale signs to help refine the search for the second digital watermark component.

In still another implementation, the first digital watermark component includes both an identifier and an orientation component.

Second Printing Stage

After first component embedding and initial printing, the document is subjected to second or later printing. A likely scenario is that a batch of documents is initially printed and then provided to a document issuer (e.g., like a DMV, state records office, company, etc.). The document issuer personalizes a document to correspond to an individual. Or the document is serialized for identification. The personalization usually takes the form of printing names, addresses, social security numbers, photographs and/or biometric information (e.g., fingerprint), etc., etc. We capitalize on this second printing stage to embed a second digital watermark component. While we imagine that the second digital watermark component will most frequently be located in document region where the second, personalized printing occurs, the present invention is not so limited. Indeed, the second printing can also reprint areas of the document that have been initially printed to embed the second digital watermark component.

In one implementation, the second digital watermark component includes a message or payload. The payload will often reflect personalized information, e.g., corresponding to the printed variable information or to a serialization scheme. In the case of embedding variable information, the second digital watermark can be read and compared against the printed variable information to determine whether the document is authentic, or whether the document's printed variable information may have been altered. The payload may also include information that is related to the first digital watermark component. The relationship may be a cryptographic permutation, subset of information, related identifiers, decoding or decryption keys, etc.

In another implementation, detection of the second digital watermark component is improved when the first digital watermark component includes an orientation component. The orientation component is determined to help locate the second digital watermark component. The orientation component may also be helpful in resolving image distortion issues. There may be issues of registration with this implementation—meaning that the second digital watermark component should be properly aligned and embedded on the document to take advantage of the first digital watermark component's orientation clues. There are many possible registration techniques. For example, in some card and ID document printers, the printer physically aligns the card to receive printing. The physical orientation of the card can be relied upon to provide appropriate alignment for the second printing. Or the physical alignment can be taken into consideration by a watermark embedder, to adjust for the physical alignment if needed. Another technique uses fiducials or alignment marks that are initially printed on a document surface. Optical sensors capture an image of the document. The captured image is then analyzed by pattern recognition software to detect the fiducials. The printing/embedding or the document's alignment can be adjusted based on the detection characteristics, if needed. Still another technique uses the orientation clues provided by the first digital watermark orientation component to help align the printing/embedding or document position. (Depending on the printing resolution, we note that registration may not be an issue. For example, signals embedded at low-resolution do not need terribly tight registration.).

Utilizing an aspect of the present invention which separates an orientation component and a payload component, a large, high-quality expensive print run of the document can be performed, and then with a lower quality non-expensive printer, an image with a variable payload is printed in a selected area of the document without detracting from the aesthetics created by the high quality printing.

In another implementation, the second digital watermark component includes both an orientation component and a payload or identifier component.

In still another implementation, a document receives more than two digital watermark components. The additional digital watermark components can be printed at still additional printing stages.

While the examples above have offered a few types of documents that may benefit from our techniques, we note that the present invention is not so limited. Indeed, traveler's checks, checks, banknotes, security documents, certificates of authenticity, stock certificates, etc., and other documents that are subjected to multiple printing stages can benefit from our techniques.

In yet another implementation, the second digital watermark component comprises a fragile digital watermark component. The fragile component is designed to be lost or to predictably degrade upon some signal processing, like scanning and printing, copying, compression, etc.

Advantages

There are many advantages to our dual-stage embedding where a first watermark component is embedded with a first printing process, and a second watermark component is embedded with a second printing process. One advantage is that the first component may be more robust, since it is often printed with higher quality techniques. Also, in some cases an extensive, high-quality printing run may be less onerous if each of the printed documents includes the same watermark component (e.g., same orientation component or same identifier). Serialization or personalized embedding can occur at a later time, on a document-by-document basis. Another advantage is that in some cases the dual watermark components can be used to buttress the security of a document, e.g., by relating the two components in some fashion. Of course there are other advantages that are apparent from the above detailed description.

Concluding Remarks

Having described and illustrated the principles of the invention with reference to specific implementations, it will be recognized that the principles thereof can be implemented in many other, different forms. To provide a comprehensive disclosure without unduly lengthening the specification, applicants incorporate by reference the patents and patent applications referenced above.

We note that the discussion regarding input device 12 and computing device 14 can be applied to input device 22 and computing device 24 as well. Also, instead of a software implementation, a digital watermark detector can be implemented with a hardware or hardware/software implementation.

The section headings in this document are provided for the reader's convenience and are not intended to limit the invention. Disclosure found under one section heading can be readily combined with disclosure found under another section heading.

In some of the above-described implementations, the first digital watermark component and the second digital watermark component are separate and distinct watermarks. Each component may be embedded using the same or different watermarking protocol and message format.

The particular combinations of elements and features in the above-detailed embodiments are exemplary only; the interchanging and substitution of these teachings with other teachings in this and the incorporated-by-reference patents/applications are expressly contemplated.

What is claimed is:

1. A method of linking a first document to at least a second document, the first document comprising a first digital watermark including a first identifier, said method comprising:

decoding the first digital watermark to obtain the first identifier;

providing a second identifier, wherein the second identifier is based on the first identifier, and embedding in the second document a second digital watermark including the second identifier.

2. The method of claim 1, wherein the second identifier comprises the first identifier.

3. The method of claim 1, wherein the second identifier comprises a cryptographic permutation of the first identifier.

4. The method of claim 1, wherein the second identifier is randomly or pseudo-randomly generated.

5. An authentication method for the second document produced according to the method of claim 1, the authentication method comprising:
   decoding the first digital watermark from the first document to obtain the first identifier;
   decoding the second digital watermark from the second document to obtain the second identifier; and
   comparing the first identifier and the second identifier to determine whether the second document is authentic.

6. The method of claim 5, wherein said comparing step comprises determining whether the first identifier and second identifier match.

7. The method of claim 5, wherein said comparing step comprises determining whether the second identifier comprises a cryptographic permutation of the first identifier.

8. The method of claim 1, wherein the first identifier includes a first set of information and second identifier includes a second set of information, wherein the first and second sets of information are related.

9. The method of claim 1, wherein the first document comprises a printed document, and said method further comprises priming the embedded second document.

10. The method of claim 1, wherein the first document comprises an identification document, and wherein the identification document comprises at least some biometric information provided on a surface thereof in the form of machine-readable indicia.

11. A method of linking a first document to at least a second document, the first document comprising a first digital watermark including a first identifier, said method comprising:
   decoding the first digital watermark to obtain the first identifier;
   providing a second identifier, wherein the second identifier is related to the first identifier; and
   embedding in the second document a second digital watermark including the second identifier, wherein the second identifier is related to the first identifier through association in a database or data record.

12. An authentication method for the first document produced according to the method of claim 11, the authentication method comprising:
   decoding the first digital watermark from the first document to obtain the first identifier;
   decoding the second digital watermark from the second document to obtain the second identifier; and
   comparing the first identifier and the second identifier to determine whether the second document is authentic, wherein said comparing step comprises accessing the data record or database to see if the first identifier and the second identifier are associated therein.

13. A method of providing security for a printed document, said method comprising:
   linking an identification document to the printed document, wherein the identification document comprises at least a photographic representation of a bearer of the identification document, the identification document further comprising machine-readable indicia, said linking comprising:
      obtaining a first identifier from the machine-readable indicia carried by the identification document;
      providing a second identifier, the second identifier relating to the first identifier; and
      printing the printed document, the printed document including the second identifier in the form of machine-readable indicia.

14. The method of claim 13, wherein the machine-readable indicia on the printed document comprises a digital watermark.

15. The method of claim 13, further comprising:
   determining whether the identification document and the printed document are linked by verifying that the first identifier and the second identifier are related.

16. The method of claim 13, wherein the second identifier relates to the first identifier via a cryptographic relationship.

17. A method of linking an identification document to an electronic file, the identification document comprising a first digital watermark including a first identifier, the identification document further comprising an orientation component to help resolve geometric distortion, the identification document further comprising electronic circuitry, said method comprising:
   obtaining the first identifier;
   providing a second identifier, wherein the second identifier corresponds to the first identifier; and
   embedding in the electronic file a second digital watermark comprising the second identifier.

18. The method of claim 17, wherein the second identifier comprises a cryptographic permutation of the first identifier.

19. The method of claim 17, wherein the identification document comprises biometric data stored in the electronic circuitry, the biometric data corresponding to a bearer of the identification document.

20. The method of claim 17, further comprising storing the electronic file in the electronic circuitry of the identification document.

21. The method of claim 17, wherein the identification document comprises a photographic representation of a bearer of the identification document provided at least on one of an identification document surface and in the electronic circuitry.

22. The method of claim 17, wherein the orientation component is embedded as a digital watermark component.

* * * * *